United States Patent [19]

Negoro

[11] Patent Number: 4,553,765
[45] Date of Patent: Nov. 19, 1985

[54] DUST GUARD FOR A SCROLL CHUCK

[76] Inventor: Hisao Negoro, Ohkubo 335, Kumatori-cho, Sennangun, Osaka, Japan

[21] Appl. No.: 667,522

[22] Filed: Nov. 2, 1984

[30] Foreign Application Priority Data

Jul. 26, 1984 [JP] Japan .................. 59-114385[U]

[51] Int. Cl.⁴ .................................................. B26B 31/16
[52] U.S. Cl. ........................... 279/1 ME; 279/116
[58] Field of Search ............... 279/1 ME, 114, 115, 279/116, 1 R

[56] References Cited

U.S. PATENT DOCUMENTS 2,275,828  3/1942  Sloan et al. ............... 279/116
2,598,165  5/1952  Harvey ..................... 279/114
2,684,251  7/1954  Church ..................... 279/116
2,725,236  11/1955 Skillin ...................... 279/116
2,726,093  12/1955 Kalenian ................... 279/116
3,028,169  4/1962  Skillin ...................... 279/114

Primary Examiner—Jimmy C. Peters
Attorney, Agent, or Firm—Griffin, Branigan & Butler

[57] ABSTRACT

In a scroll chuck accommodating a scroll plate, a dust guard is fitted in a continuous groove formed by the scroll thread of the scroll plate. The dust guard consists of an elastic cord made of a material having rubber-like elasticity, and has such a length as to extend over the full length of the continuous groove. The outside surface of the elastic cord is substantially flush with the crest of the scroll thread.

1 Claim, 2 Drawing Figures

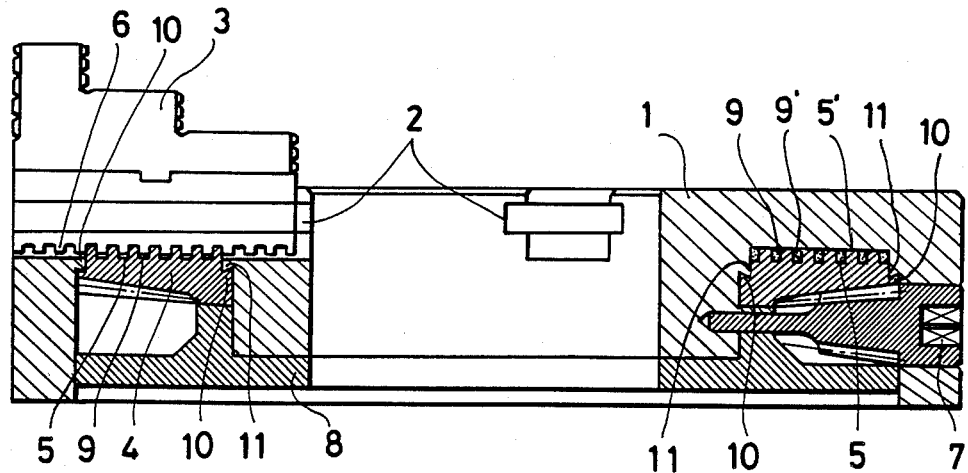

DUST GUARD FOR A SCROLL CHUCK

BACKGROUND OF THE INVENTION

The present invention relates to a dust guard for a scroll chuck for use in holding a work in a machine tool or the like.

It is known to use a scroll chuck in a machine tool such as a lathe, a milling machine or a drilling machine. The prior art scroll chuck comprises a main body having a plurality of chuck slots radially formed in its surface, a chuck jaw slidably fitted in each of the chuck slots and consisting of a master jaw and a top jaw, and a scroll plate accommodated in the main body and provided with a scroll thread on its front surface for engaging with a rack provided on the rear surface of each chuch jaw. All jaws are adapted to radially move in or out simultaneously because of the provision of a bevel pinion engaging with a bevel gear provided on the lower surface of the scroll plate.

When the chuck jaws are disposed at or near the inside or outside limit of their radial travel, a large portion of the scroll thread is left unoccupied by the chuck jaws and exposed to the ambient air through the chuck slots. The onerous problem involved in this condition is that chips fall into the chuck slots and stick between the flanks of the scroll thread. Therefore, when the scroll plate is turned after a cutting operation and the chip-clad portion of the scroll thread comes into mesh engagement with the rack provided on the lower surface of each chuck jaw, it becomes difficult to turn the scroll plate further. Thus the prior art scroll chuck has a disadvantage that more effort is required to move the chuck jaws after a cutting operation. The prior art scroll chuck has another disadvantage that it is very difficult to remove the chips from between the flanks of the scroll thread because the chuck slots are so narrow that most of the scroll plate is hidden by the main body.

A dustproof cover or covers to keep chips and dirt out of the chuck slots may be provided as an attempt to solve the above problem. However, such a cover or covers cannot but be of a complicated and expensive nature because they have to meet the structural requirement for providing the chuck jaws with radial movability.

SUMMARY OF THE INVENTION

It is therefore an object of this invention to provide a dust guard for a scroll chuck based on a different concept for solving the above-described problem and improved by eliminating the weakpoints or disadvantages of the prior art scroll chuck.

In accordance with this invention, chips falling into the chuck slots are prevented from sticking between the flanks of the scroll thread and can be easily swept off, because an elastic cord made of an oil-proof material such as urethane rubber and having such a length as to extend over the full length of the continuous groove of the scroll thread is fitted therein in such a manner that the outside surface of the elastic cord is substantially flush with the crest of the scroll thread.

Like the scroll plate of the conventional scroll chuck, the scroll plate of this invention also turns when the bevel pinion is turned by turning a chuck wrench. Since the elastic cord is compressed in the portions where the chuck jaws engage with the scroll thread, this elastic cord does not exert any adverse influence on the turning movement of the scroll plate and the radial inward or outward movement of the chuck jaws. In the portions other than those where the chuck jaws engage with the scroll thread, the outside surface of the elastic cord is substantially flush with the crest of the scroll thread, so that the space between the flanks of the scroll thread is blocked by the elastic cord. Consequently, chips falling into the chuck slots in the latter portions are prevented by the elastic cord from sticking between the flanks of the scroll thread and can be easily swept off with a brush or the like.

A preferred embodiment of the present invention is hereinafter described with reference to the accompanying drawings.

DETAILED DESCRIPTION OF THE INVENTION

Figure 1:
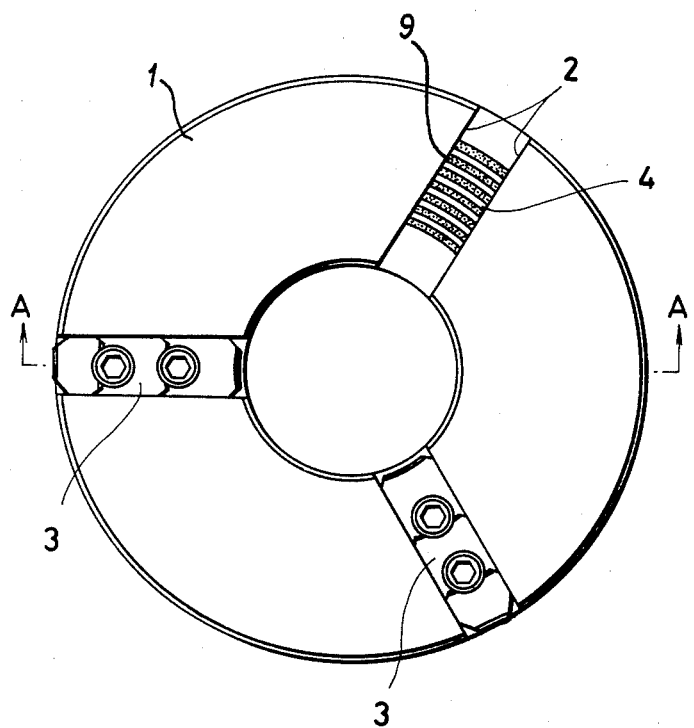
FIG. 1 is a plan view of a scroll chuck provided with a dust guard according to the present invention.
Figure 2:
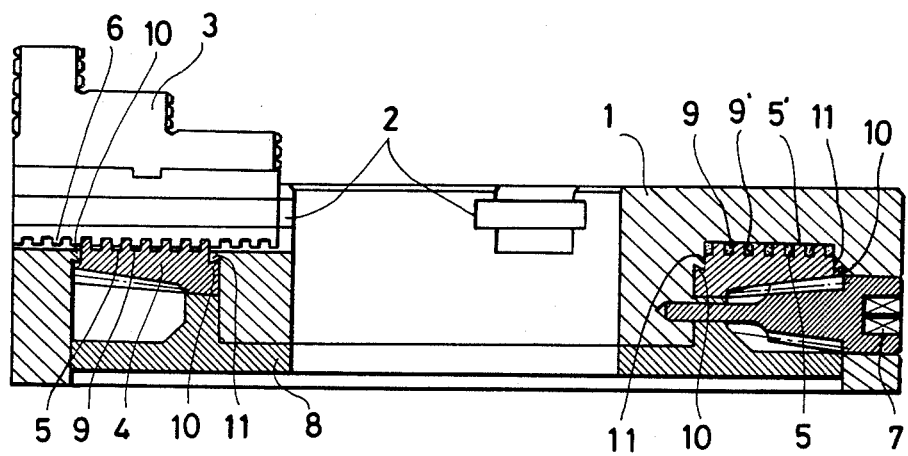
FIG. 2 is an enlarged vertical section taken along line A—A of FIG. 1.

Referring to the drawings, the numeral 1 refers to the disk-shaped main body of a scroll chuck having a plurality of chuck slots 2 radially and equiangularly formed in its surface. A chuck jaw 3 is fitted in each chuck slot 2 and adapted to slidingly move in or out in the radial direction. The numeral 4 refers to an annular scroll plate accommodated in the main body 1 and provided with a scroll thread 5 on its upper surface for engaging with a rack 6 provided on the lower surface of each chuck jaw 3. The main body 1 has a radial socket for receiving a bevel pinion 7 by which the scroll plate 4 can be turned. The numeral 8 refers to a back plate secured to the back of the main body 1. The numeral 9 refers to an elastic cord made of an oil-proof material having rubberlike elasticity such as urethane rubber or porous polyurethane foam. The elastic cord 9 is fitted in the continuous groove of the scroll thread 5 in such a manner that the lower surface of the elastic cord 9 touches the root of the scroll thread 5 while the upper surface 9′ of the elastic cord 9 is substantially flush with the crest 5′ of the scroll thread 5. As shown in FIG. 2, it is presently preferred that the elastic cord 9 is solid. It is within the scope of this invention, however, that, if desired, the elastic cord 9 may be a hollow tubular body.

The inside and outside cylindrical surfaces of the annular scroll plate 4 run parallel with the axis of the scroll plate 4. Funnel-shaped shoulders 10 of N section are formed on these cylindrical surfaces to provide seats for abutting against shoulders 11 complementarily formed on the cylindrical surfaces of an annular groove provided in the main body 1.

From the foregoing description of the preferred embodiment, it will be apparent that the present invention permits smooth revolution of the scroll plate 4 because chips falling into the chuck slots 2 are prevented by the elastic cord 9 from sticking between the flanks of the scroll thread 5.

The present invention has another advantage that the chips falling into the chuck slots 2 in the portions left unoccupied by the chuck jaws 3 can be easily swept off with a brush or the like.

The present invention has still another advantage that the elastic cord 9, if it is made of a porous material such as polyurethane foam, can soak up lubricating oil easily and let it out when squeezed by the racks 6 so as to keep the racks 6 and the scroll thread 5 in a well-lubricated condition over a long period of time.

The present invention has yet still another advantage that the scroll plate 4 can be kept concentric with the main body 1 over a long period of time because the funnel-shaped shoulders 10 of N section serve to prevent chips from entering into the deeper portion of the gap between the inside cylindrical surface of the annular scroll plate 4 and that of the annular groove in the main body 1 and the gap between the outside cylindrical surface of the annular scroll plate 4 and that of the annular groove in the main body 1.

What is claimed is:

1. In a scroll chuck comprising a main body having a plurality of chuck slots radially formed in its surface, a chuck jaw slidably fitted in each of said chuck slots, and a scroll plate accommodated in said main body and provided with a scroll thread on its front surface in the form of a continuous groove for engaging with a rack provided on the rear surface of said chuck jaw, the improvement comprising:

a dust guard consisting of an elastic cord made of a material having rubberlike elasticity, said elastic cord being fitted in said continuous groove over the full length thereof in such a manner that the inmost surface of said elastic cord touches the root of said scroll thread while the outside surface of said elastic cord is substantially flush with the crest of said scroll thread.

* * * * *